United States Patent
Lazzari et al.

(10) Patent No.: US 8,833,493 B2
(45) Date of Patent: Sep. 16, 2014

(54) MECHANICAL WORKS SAMPLING SYSTEM FOR THE OPERATION OF ARTICULATED EXTENSIONS IN VEHICULAR APPLICATIONS

(75) Inventors: Sandro Lazzari, La Spezia (IT); Giovanni La Spina, La Spezia (IT)

(73) Assignee: OTO Melara S.p.A., La Spezia (IT)

( * ) Notice: Subject to any disclaimer, the term of this patent is extended or adjusted under 35 U.S.C. 154(b) by 216 days.

(21) Appl. No.: 13/351,905

(22) Filed: Jan. 17, 2012

(65) Prior Publication Data

US 2012/0186886 A1    Jul. 26, 2012

(30) Foreign Application Priority Data

Jan. 20, 2011   (IT) .............................. TO2011A0037

(51) Int. Cl.
  *B62D 55/075*   (2006.01)
  *B62D 55/065*   (2006.01)
(52) U.S. Cl.
  CPC .......... *B62D 55/075* (2013.01); *B62D 55/0655* (2013.01)
  USPC ....................................................... 180/9.32
(58) Field of Classification Search
  USPC ................................................. 180/9.1, 9.32
  See application file for complete search history.

(56) References Cited

U.S. PATENT DOCUMENTS

| 3,166,138 | A | * | 1/1965 | Dunn, Jr. ..................... 180/9.23 |
| 3,288,234 | A | * | 11/1966 | Feliz ................................ 180/6.5 |
| 4,932,831 | A | * | 6/1990 | White et al. ................... 414/732 |
| 5,022,812 | A | * | 6/1991 | Coughlan et al. ............. 414/729 |
| 5,443,354 | A | * | 8/1995 | Stone et al. .................... 414/729 |
| 6,431,296 | B1 | * | 8/2002 | Won .............................. 180/9.32 |
| 7,316,405 | B2 | * | 1/2008 | Kritman et al. .............. 280/5.22 |
| 7,556,108 | B2 | * | 7/2009 | Won .............................. 180/9.32 |
| 7,654,348 | B2 | * | 2/2010 | Ohm et al. .................... 180/9.32 |
| 8,322,470 | B2 | * | 12/2012 | Ohm et al. .................... 180/9.32 |
| 2007/0267230 | A1 | | 11/2007 | Won |
| 2008/0183332 | A1 | | 7/2008 | Ohm et al. |

OTHER PUBLICATIONS

Italian Search Report for Italian Application No. TO 2011 A 000 037 mailed Aug. 24, 2011.

* cited by examiner

*Primary Examiner* — Kevin Hurley
(74) *Attorney, Agent, or Firm* — Merchant & Gould P.C.

(57) ABSTRACT

A mechanical work sampling system (10) is for the operation of extensions articulated in vehicular applications. The system is susceptible of being applied on a tracked vehicle (30) and includes at least a supporting arm (40) and a secondary track (22; 23) associated to the supporting arm. The supporting arm (40) is configurable in rotation configuration within which it rotates with respect to a first end (41) through a sampling of work from the main propulsor of the tracked vehicle (30).

7 Claims, 5 Drawing Sheets

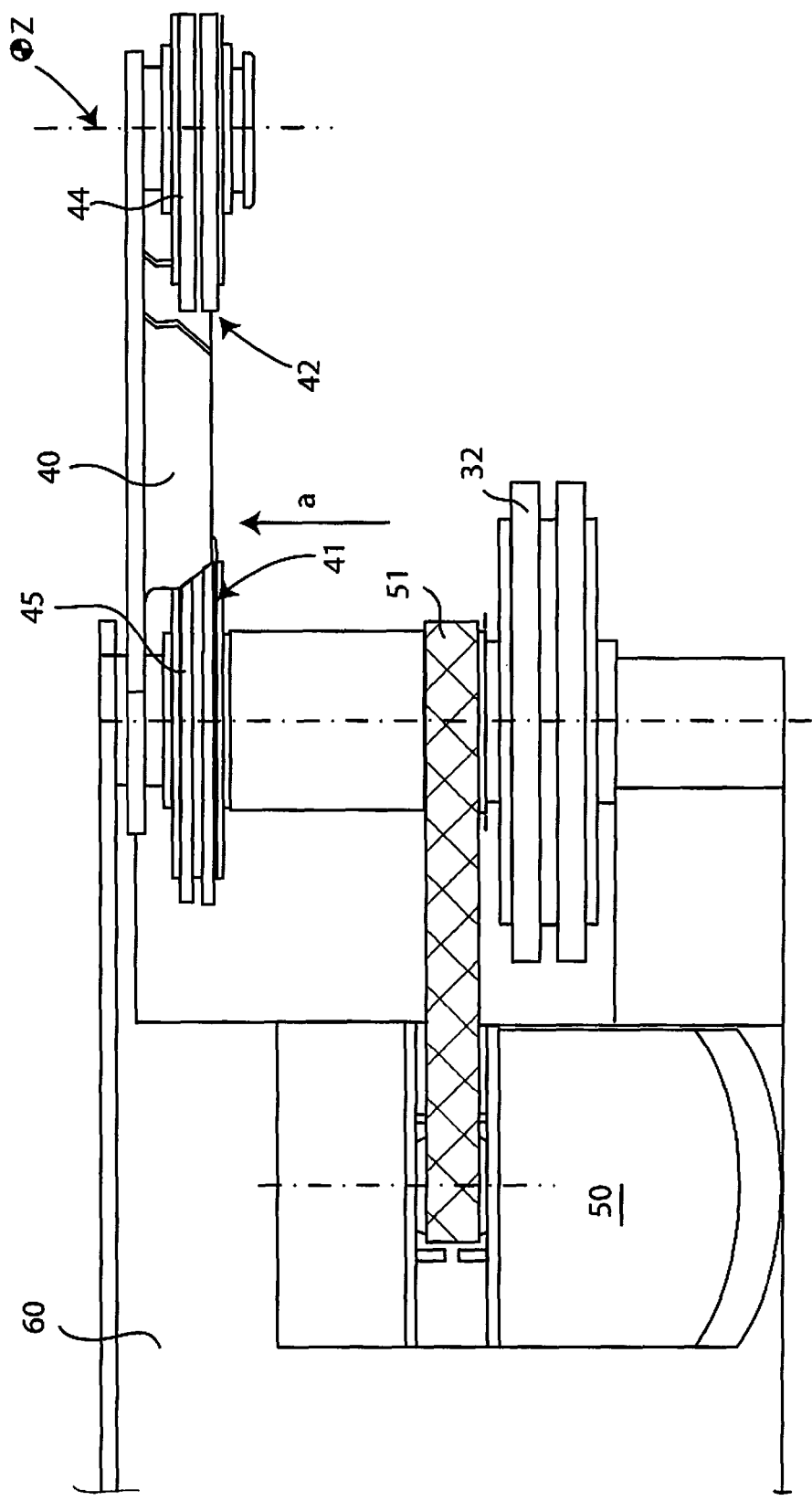

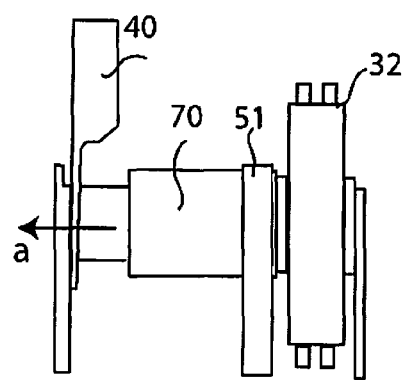 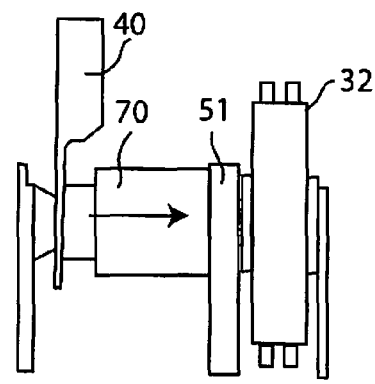
*Fig.3*    *Fig.4*

US 8,833,493 B2

MECHANICAL WORKS SAMPLING SYSTEM FOR THE OPERATION OF ARTICULATED EXTENSIONS IN VEHICULAR APPLICATIONS

This application claims benefit of Serial No. TO 2011 A 000 037, filed 20 Jan. 2011 in Italy and which application is incorporated herein by reference. To the extent appropriate, a claim of priority is made to the above disclosed application.

BACKGROUND

The present invention relates to a mechanical work system, more in particular to a mechanical work sampling system for operating articulated extensions in vehicular applications.

It is known that tracked vehicles can easily run within unstructured environments and overcome relatively tall obstacles. The ability of running over rough terrain and of overcoming steps is due to a plurality of factors, among which at least the track geometry and the vehicle's centre of gravity.

The high degree of mobility of tracked vehicles is particularly useful in the field of terrestrial robotics, wherein the ability of running over high steps or stair ramps is often a very important requirement.

At the same time, however, the tracked vehicle must typically carry sensors and actuators, the presence and position of which are defined for each particular case depending on the application or mission it is intended for.

This involves a certain degree of uncertainty as to the exact positioning of the centre of gravity of a tracked vehicle for terrestrial robotics applications. Rather than with reference to the tracked vehicle alone, said centre of gravity can only be calculated after having defined the whole set of sensors and actuators it must carry; however, if the actuators are mobile ones, or anyway if their operation causes any configuration changes, this may lead to non-negligible variations in the position of the vehicle's centre of gravity.

This uncertainty in the calculation of the centre of gravity of a tracked vehicle for terrestrial robotics applications is often a problem when overcoming some types of obstacles, which might jeopardize the stability of the vehicle or even, in the worst cases, cause the capsizing of the vehicle.

The above-mentioned problem has been partially solved in the field of the so-called unmanned vehicles; in this case, articulated extensions have been added to wheels and tracks. Although these mechanical extensions are devices that may allow variable control of the length of a vehicle in order to make the latter more stable and less prone to capsize when running over obstacles, they also increase the overall complexity of the entire mechatronic apparatus. Each extension, in fact, needs at least one additional actuator to control its elevation or extension, and at least one further actuator when the track of the extension is autonomously controlled by the main tracks of the vehicle.

SUMMARY

It is therefore the object of the present invention to disclose a mechanical work sampling system for operating articulated extensions in vehicular applications, which is free from the above-described drawbacks.

According to the present invention, a mechanical work sampling system for operating articulated extensions in vehicular applications.

BRIEF DESCRIPTION OF THE DRAWINGS

The invention will now be described with reference to the annexed drawings, which illustrate a non-limiting embodiment thereof, wherein:

FIG. 2 shows a plan view of a detail of FIG. 1;

FIG. 3 and FIG. 4 respectively show a first and a second configurations of the system according to the present invention;

DETAILED DESCRIPTION

Figure 1:
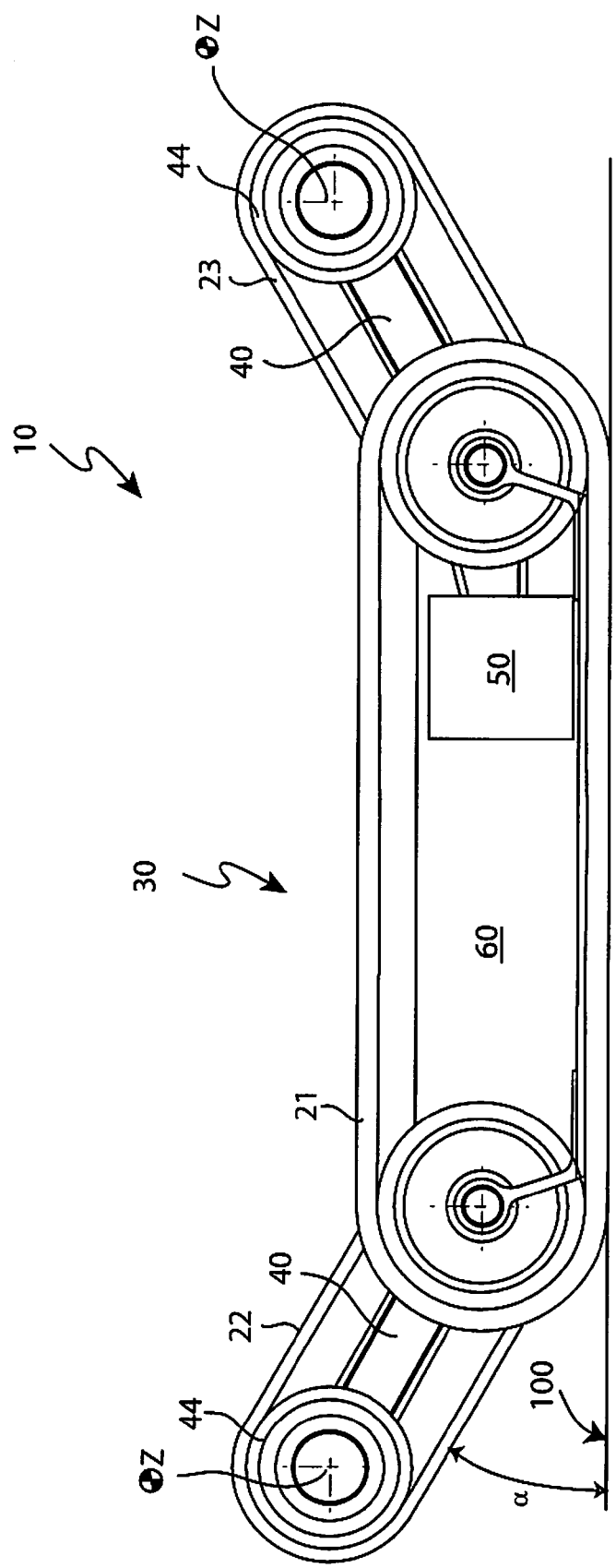
FIG. 1 is a side view of a portion of a tracked vehicle fitted with a mechanical work sampling system for operating articulated extensions in vehicular applications according to the present invention.

Referring now to FIG. 1, reference numeral 10 designates as a whole a mechanical work sampling system for operating articulated extensions in vehicular applications.

System 10 is based on the recognition of the practical usefulness of a variable geometry of a track of a tracked vehicle 30, and is especially designed for overcoming steps or stair ramps.

In particular, tracked vehicle 30 has a first pair of main tracks 21, respectively positioned on the left side and on the right side of the vehicle itself, and a plurality of systems 10, each comprising at least one secondary track.

Therefore, vehicle 30 shown in FIG. 1 includes a second and a third pair of secondary tracks 22, 23, respectively arranged as follows:

the second pair of secondary tracks 22 are positioned on a front part of vehicle 30, wherein the second pair of secondary tracks include one track installed on the left side and one track installed on the right side; for this reason, a pair of systems 10 according to the present invention are fitted on the front part of vehicle 30;

the third pair of secondary tracks 23 are positioned on a rear part of vehicle 30, wherein the third pair of secondary tracks include one track installed on the left side and one track installed on the right side; a pair of systems 10 according to the present invention are therefore also present at the rear of vehicle 30.

The secondary tracks move in the same direction as main tracks 21.

The second and third pairs of secondary tracks 22, 23 are installed, in particular, on a plurality of support arms 40, each having a first end 41 constrained to an axis coinciding with that of a driven or drive wheel carrying a track of the first pair of main tracks 21, and a second end 42 on which a respective first driven wheel 44 is installed, which is susceptible of tensioning the secondary track together with a second driven wheel 45 (not shown in FIG. 1 because hidden by drive wheel 32 of the main track), rotating about an axis parallel to that of the first driven wheel 44.

In FIG. 1, for example, the third pair of secondary tracks 23 have respective left and right support arms 40, which are constrained to a driving wheel 32 of the pair of main tracks 21; driving wheel 32 is turned by at least one main propulsor 50, schematically shown as a square box for simplicity.

Each one of support arms 40 can rotate about the first end 41, so that the secondary tracks of the second and third pairs of tracks 22, 23 can tilt at a variable angle α upwards or downwards with respect to a plane of ground 100 on which tracked vehicle 30 is moving.

FIG. 2, which is a plan view of a detail of FIG. 1, shows a chassis 60 of the tracked vehicle 30, whereto a shaft is constrained on which driving wheel 32 rotates, the latter receiving motion from the main propulsor 50 through a drive belt 51 turning on a couple of axes parallel to axis z.

The second driven wheel 45 of the secondary track, axially positioned on support arm 40, is also connected to this shaft.

Each one of the support arms 40 can slide with respect to the shaft in a direction orthogonal to its axis, i.e. it can slide sideways to the left and to the right with respect to the direction of forward motion of the vehicle 30, as shown in FIG. 2 by arrow a, i.e. parallel to axis z.

Therefore, each one of support arms 40 has a first and a second operating configurations.

In the first operating configuration, as shown in the detail of FIG. 3, a coupling takes place, for example and without limitation by means of bevel gears, between support arm 40 and chassis 60.

On the contrary, the second operating configuration, as shown in the detail of FIG. 4, corresponds to a coupling between support arm 40 and main propulsor 50 which takes place through a driven pulley 70 driven by said propulsor and mounted axially on the shaft.

When switching from the first to the second operating configuration, the first and second driven wheels 44, 45 associated with support arm 40 keep working in the axial position with respect to the arm itself; being idle, they can rotate with respect to support arm 40 when main propulsor 50 is on.

However, while in the first operating configuration support arm 40 is locked to a fixed angle α, in the second operating configuration support arm 40 is rotated on the first end 41 and takes work off main propulsor 50.

As previously described, the coupling between the first end 41 of support arm 40 and driven pulley 70 occurs through the use of bevel gears; however, a similar system employs a pair of clutches arranged at the axis of rotation of support arm 40.

Figure 5:
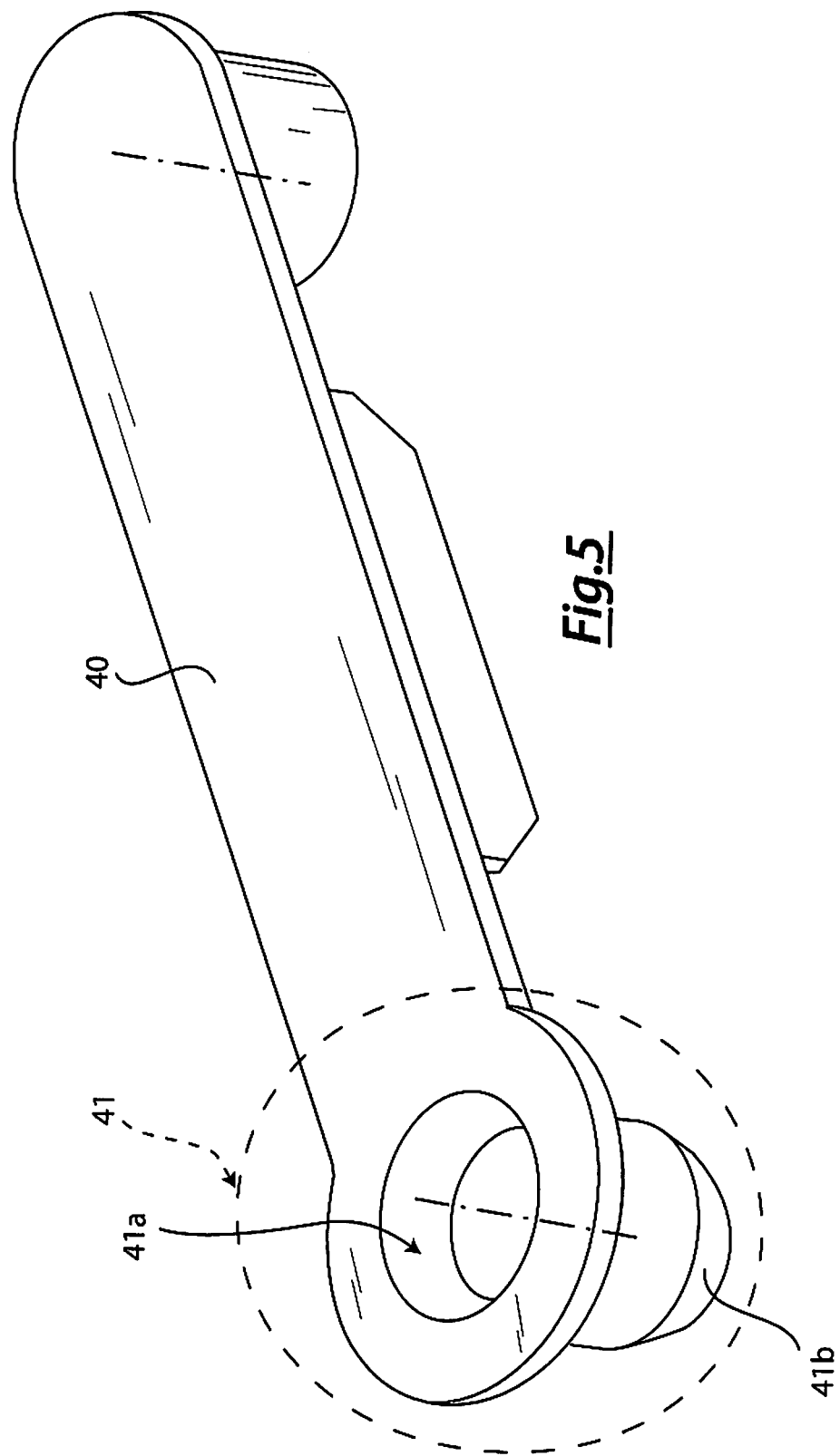
FIG. 5 shows a detail of a support arm of the system according to the present invention.

In such a case, as shown in FIG. 5, the first end 41 of support arm 40 has a cylindrical body 41a which, when in use, is at least partially inserted in the body of the driven pulley; cylindrical body 41a ends with a hollow male truncated conical section 41b.

Figure 6:
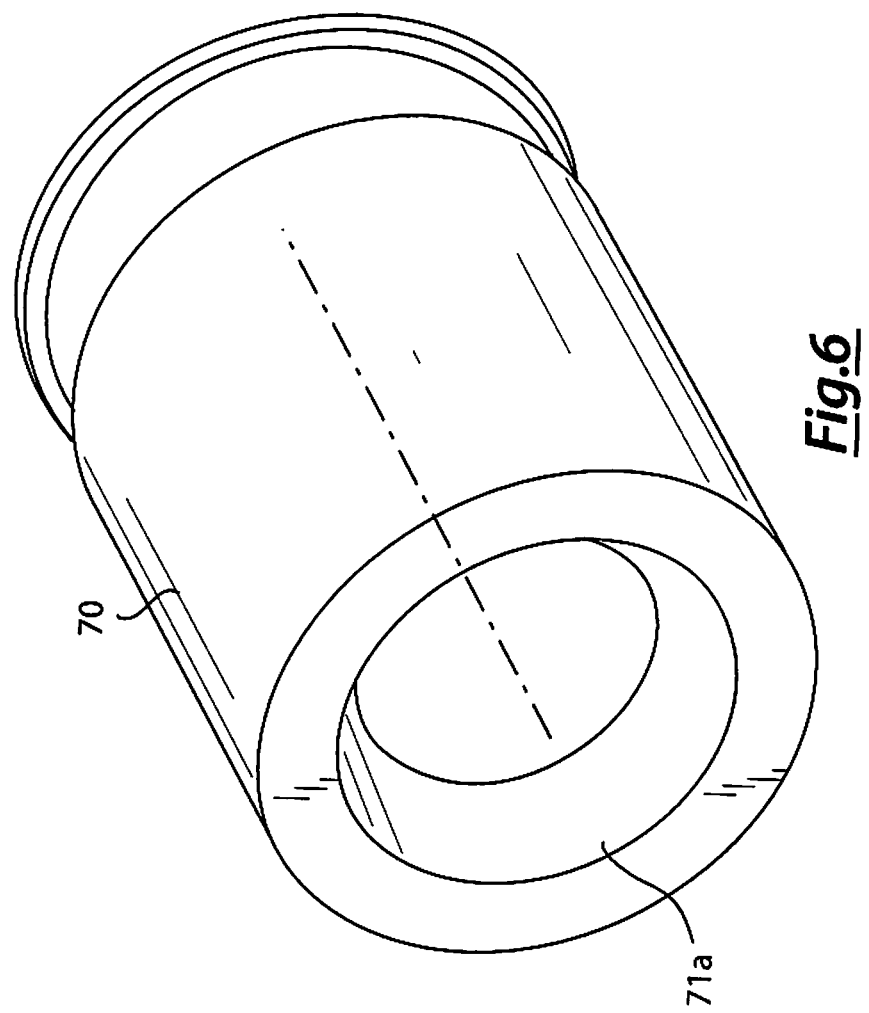
FIG. 6 shows a perspective view of a detail of a pulley belonging to the system according to the present invention.

Driven pulley 70, shown in FIG. 6, is also hollow and has one end terminating with a female truncated conical section 71a which, when in use, couples to the end of cylindrical body 41a by contrast.

In the first operating configuration, the truncated conical ends do not touch each other, so that the arm is locked at a predefined angle.

In the second operating configuration, instead, the truncated conical ends are brought near and therefore enter a configuration wherein they are mutually coupled by contrast; the driven pulley and support arm 40 are thus coupled together, and the rotation of support arm 40 can be governed through main propulsor 50.

Finally, system 1 according to the present invention is provided with limit switches (not shown) that may be linked to additional safety devices to ensure that support arms 40 are used properly within the angular spaces required by a specific application and in accordance with the vehicle's dimensions.

The advantages of the mechanical work sampling system for operating articulated extensions in vehicular applications are apparent from the above description. In particular, it allows to change the position of the centre of gravity of a tracked vehicle, while at the same time allowing to overcome obstacles which traditionally might cause the vehicle to turn over or anyway jeopardize its stability.

The system according to the present invention can be easily designed and manufactured, thus contributing to keeping the final cost of the tracked vehicle as low as possible.

The system described so far may be subject to a number of variations, modifications and additions which are obvious to those skilled in the art, without however departing from the protection scope set forth in the appended claims.

In particular, it is clear that the truncated conical couplings shown in the annexed drawings and described above may equivalently be replaced with clutching means arranged at the axis of rotation of the support arm.

The invention claimed is:

1. A mechanical work sampling system for the operation of extensions articulated in vehicular applications; the system being configured for use with a tracked vehicle; said system comprising:
   at least a supporting arm and a secondary track associated to said supporting arm; said supporting arm being configurable in a rotation configuration within which said supporting arm rotates with respect to a first end through a sampling of work from a propulsor of said tracked vehicle;
   a pulley adapted for being coupled to an end of said supporting arm;
   wherein said pulley comprises a truncated conical section and wherein said supporting arm has on an end a body ending with a truncated conical section; said truncated conical section of said pulley and said truncated conical section of said body being adapted for mutually coupling in use.

2. The system according to claim 1, wherein said supporting arm comprises another configuration within which said supporting arm is fixed with respect to said tracked vehicle.

3. The system according to claim 1, wherein said supporting arm comprises a second end opposed with respect to said first end; said system further comprising a first and second wheel, positioned respectively upon said first and second end and upon which is installed said secondary track.

4. The system according to claim 1, wherein said truncated conical section of said pulley and said truncated conical section of said body are respectively of male and female type or of female and male type.

5. Tracked vehicle, comprising a mechanical work sampling system for the operation of extensions articulated in vehicular applications according to claim 1.

6. The tracked vehicle according to claim 5, configured for the overcoming steps and ramps, comprising a pair of main tracks each one installed on at least a pair of wheels, and wherein for each wheel of said pair of wheels of each of said main tracks is installed said work sampling system.

7. The tracked vehicle according to claim 5, configured for moving on ground, and wherein said supporting arm of said system, in said rotation configuration, varies an angle between said supporting arm and said ground.

* * * * *